March 31, 1970          H. DILCHERT          3,503,334
SOLID PROPELLANT CHARGE FOR ROCKETS
Filed Sept. 27, 1967          2 Sheets-Sheet 1
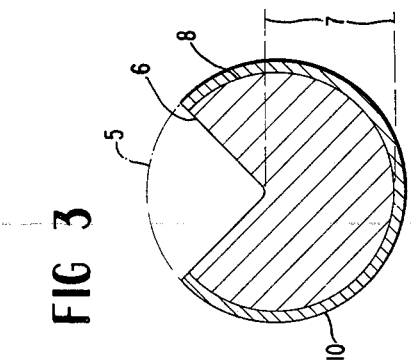
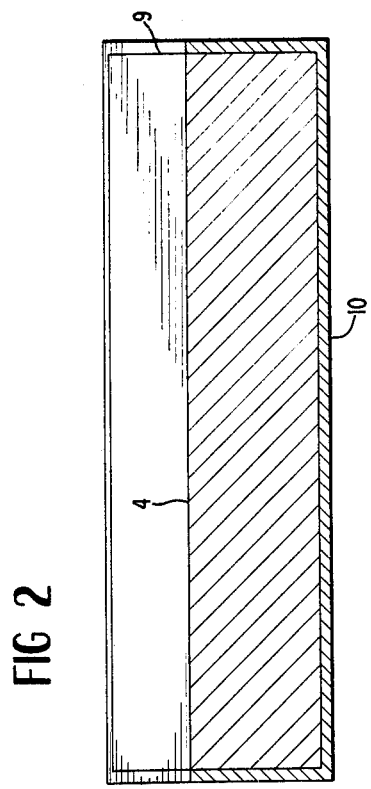
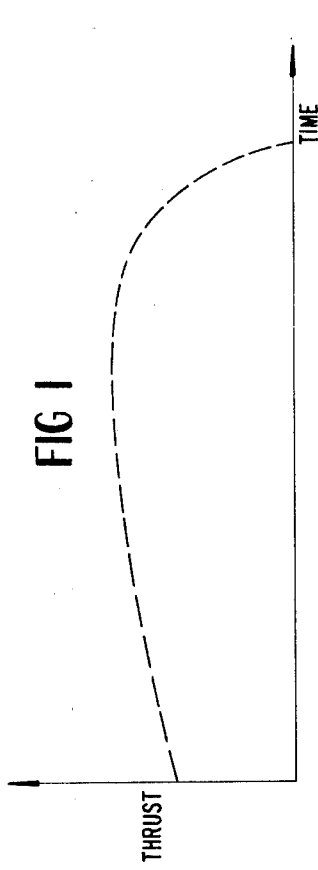
INVENTOR
HEINZ DILCHERT
BY *Craig & Antonelli*
ATTORNEYS March 31, 1970  H. DILCHERT  3,503,334
SOLID PROPELLANT CHARGE FOR ROCKETS
Filed Sept. 27, 1967  2 Sheets-Sheet 2

INVENTOR
HEINZ DILCHERT

BY

*Craig, Antonelli, Stewart & Hill*  ATTORNEYS

United States Patent Office 3,503,334
Patented Mar. 31, 1970

3,503,334
SOLID PROPELLANT CHARGE FOR ROCKETS
Heinz Dilchert, Steyerberg, Germany, assignor to Dynamit Nobel Aktiengesellschaft, Troisdorf, Germany
Filed Sept. 27, 1967, Ser. No. 670,968
Claims priority, application Germany, Sept. 30, 1966,
D 51,211
Int. Cl. F42b *9/14*
U.S. Cl. 102—103                                                7 Claims

ABSTRACT OF THE DISCLOSURE

A solid propellant charge for rockets, particularly for line-throwing rockets, comprising a massive cylindrical body of solid propellant having an axially parallel recess in the shape of a wedge or the like, said recess extending along the entire length of said body, and the walls of said recess forming the combustion surface for the fuel.

BACKGROUND OF THE INVENTION

This invention relates to a solid propellant charge. More particularly, it relates to a solid propellant charge for line-throwing rockets.

In line-throwing rockets, the dead load, as well as the air resistance, increases with an increase in the flight path because of the fact that the length of the line section which is entrained increases to the same extent. This can be compensated for by constructing the propellant charge for the rocket in such a manner that the instantaneous thrust thereof increases correspondingly with an increase in the flight path. In order to prevent the line from breaking, care must be taken, however, not to accelerate the rocket at any phase of its flight to such a degree that the pull exerted by the rocket upon the line does not exceed the permissible tensile stress on the line. In order to prevent with certainty that such an overload on the line does not occur even in the final phase of the throwing process, the propellant charge must furthermore be fashioned so that the rocket thrust, during this section of the throwing process, decreases to such an extent that, at each instant of the rocket flight phase in question, the total energy still present at that particular instant corresponds as accurately as possible to the energy required for overcoming the air resistance and for pulling out the residual portion of the line.

In addition to these general conditions, there is the requirement for as low a weight as possible and for a small compact diameter of the line-throwing rocket.

In order to meet all of these requirements and to obtain a thrust-time diagram similar to that illustrated in FIGURE 1, which is generally desired, the total impulse of the rocket would have to be distributed extensively uniformly over the total flight time thereof, or at least over almost the entire flight time thereof. However, this would entail the prerequisite of such long combustion times for the propellant charge and thus such a large fuel capacity with the presently known rocket composition geometries which cannot be realized while at the same time maintaining the required small projectile diameter.

Accordingly, one of the objects of the present invention is to provide a solid propellant charge for rockets, particularly for line-throwing rockets, which meets the requirements set forth hereinabove.

Another object of the present invention is to provide a solid propellant charge for line-throwing rockets which can be used to give a thrust-time diagram similar to that illustrated in FIGURE 1.

A further object of the invention is to provide a solid propellant charge for all rockets wherein a small rocket diameter and a longer combustion time is desired.

A still further object of the invention is to provide a greatly improved solid propellant charge for rockets.

These and other objects and advantages of the present invention will become apparent to those skilled in the art from a consideration of the following specification and claims.

SUMMARY OF THE INVENTION

In order to attain the above-described objects and to overcome the deficiencies of the prior art, the present invention proposes a solid propellant charge which is constructed as a massive cylindrical body having an approximately wedge-shaped recess extending along the entire length thereof. This recess is axially parallel and forms the combustion surface with its walls.

As noted above, in addition to being used for rockets intended for line-throwing, the propellant charge of the present invention can be employed advantageously in all cases wherein a small rocket-diameter and a longer combustion time is desired, but wherein at the same time a thrust of such magnitudes is required as cannot be obtained with a front burner propellant charge having the same rocket diameter. Thus, in this connection, the thrust-time diagram of FIGURE 1 does not play as important a role as in the throwing of lines.

The following requirements are assumed to be demanded from a propulsion unit:

Total impulse—30 kp. sec.[1]
Starting weight of the rocket—0.75 kg.
Average thrust—7.5 kp.
Combustion time—4 sec.
Internal diameter of the combustion chamber—28 mm.
Powder diameter—26 mm.

[1] 1 kp.=the force by which the mass of 1 kg. is attracted by the earth at a latitude of 45° (in Paris).

With a front burner having a diameter of 26 mm., equal to 5.3 cm.$^2$, of combustion surface or area, a powder having a combustion velocity of 45 mm./sec. would be required for attaining the desired average thrust of 7.5 kp. Fuels having such a combustion velocity yet belong to the special fuels which are still in the development stage at the present time and wherein it is as yet undetermined whether they will ever be usable and operable for small rockets.

In contradistinction thereto, the problem posed above can be solved without difficulties by the propelant charge of the present invention. This can be seen from the following data which relates to the propellant charge disclosed herein:

Fuel combustion velocity (selected)—4 mm./sec.
Specific impulse of the fuel—200 sec.
Weight of powder—0.15 kg.
Combustion area required (average)—59 cm.$^2$

BRIEF DESCRIPTION OF THE DRAWING

The attached drawing illustrates one embodiment of the present invention. The invention is explained in detail below with reference to this embodiment.

As noted above, FIGURE 1 shows the type of thrust-time diagram desired for line-throwing rockets;

FIGURE 2 shows the solid propellant charge of the present invention in an axial sectional view;

FIGURE 3 shows the solid propellant charge of the present invention in a cross-sectional view.

DESCRIPTION OF A PREFERRED EMBODIMENT

Figure 4:
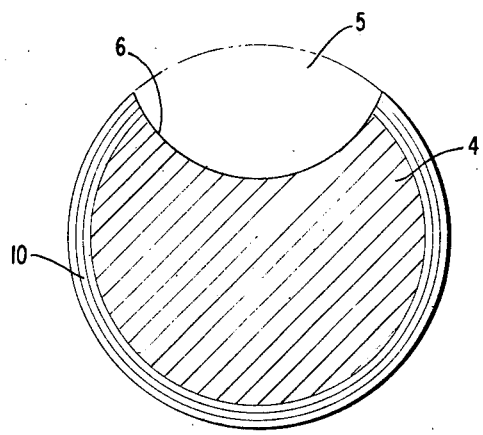
FIGURE 4 is a cross-sectional view illustrating another embodiment of the solid propellant charge shown in FIGURE 3.

Referring to the drawing, the fuel body 4, protected against burning at its cylindrical outer surface 8, as well as at its two front ends 9 by means of the insulation 10, is provided with a V-shaped recess 5 extending along the entire length of the fuel body. The noninsulated flanks 6 of recess 5 form the initiating surface and thereafter the combustion surface.

Reference numeral 7 denotes the largest fuel depth or capacity determining the combustion time, as well as the size of the initial combustion surface and thus the starting thrust of the propellant charge.

As can be seen from FIGURE 3, these magnitudes do not change even when the wedge angle formed by the flanks 6 is altered. However, the size of this wedge angle determines, in conjunction with the circular cross-sectional shape of the fuel body 4, the size of the respective combustion area and thus the respective magnitude of the thrust during the progressive combustion of the propellant charge. Hence, it is possible to vary as desired, by correspondingly selecting the depth and the wedge angle of the recess 5, the form or shape of the thrust-time curve shown in FIGURE 1 in dashed lines within certain limits as to the duration as well as the magnitude of the thrust. Of course, this is not only true for a fuel body of the diameter illustrated in the drawing and with the illustrated cross-sectional shape of the recess 5, but is also true for fuel bodies having a larger or also a smaller diameter and a different cross-sectional shape of the recess 5, for example, those having more or less strongly curved flanks, up to a cylindrical configuration of the combustion area.

It is to be understood that the present invention is directed to the construction per se of solid propellant charges for rockets, particularly line-throwing rockets. Accordingly, the composition of the propellant may be any of the solid fuels known or suitable in the art for the purposes indicated above. They are easily ascertainable by those skilled in the art. Similarly, the disposition of the particular solid propellant charge of the present invention within a rocket may be effected as suitable for attaining the objects of the invention.

The invention being thus described, it will be obvious that the same may be varied in many ways. Such variations are not to be regarded as a departure from the spirit and scope of the invention, and all such modifications are intended to be included within the scope thereof.

I claim:

1. A solid propellant charge for rockets comprising a cylindrical body of solid propellant having a single axially parallel recess therein, said recess extending along the entire length of said body, only the circumferential periphery of said body and both ends thereof having insulation thereon so that the walls of said recess, in their entirety, form the combustion surface.

2. A solid propellant charge according to claim 1, wherein said recess has the shape of a wedge.

3. A solid propellant charge according to claim 1, wherein the walls of said recess are curved.

4. A solid propellant charge for line-throwing rockets comprising a cylindrical body of solid propellant having a single axially parallel recess in the shape of a wedge, said recess extending along the entire length of said body, only the circumferential periphery of said body and both ends thereof having insulation thereon so that the walls of said recess, in their entirety, form the combustion surface for the charge.

5. A rocket having disposed therein the solid propellant charge of claim 1.

6. A line-throwing rocket having disposed therein the solid propellant charge of claim 4.

7. A solid propellant charge for rockets having a high combustion surface to propellant diameter ratio, which comprises a cylindrical body of solid propellant having a single longitudinally disposed recess therein, said recess extending over the entire length of said body and having a wedge-shaped configuration, only the circumferential periphery of said body and both ends thereof having insulation thereon, so that the walls of said recess, in their entirety, form the combustion surface.

References Cited

UNITED STATES PATENTS

| 3,014,427 | 12/1961 | Scurlock | 102—100 |
| 3,144,830 | 8/1964 | De Fries et al. | 102—103 |

FOREIGN PATENTS

| 139,220 | 2/1953 | Sweden. |
| 85,530 | 5/1955 | Norway. |

OTHER REFERENCES

Vogel: A Quasi-Morphological Approach to the Geometry of Charges for Solid Propellant Rockets: The Family Tree of Charge Designs, Jet Propulsion, February 1956, pp. 102–105.

BENJAMIN A. BORCHELT, Primary Examiner

JAMES FOX, Assistant Examiner

U.S. Cl. X.R.

102—100